United States Patent [19]

Mogilnicki

[11] Patent Number: 5,109,706
[45] Date of Patent: May 5, 1992

[54] TIGHTENING FIXTURE WITH BUILT-IN TORQUE READOUT DEVICE

[75] Inventor: Victor D. Mogilnicki, Raleigh, N.C.

[73] Assignee: Kennametal Inc., Latrobe, Pa.

[21] Appl. No.: 549,348

[22] Filed: Jul. 6, 1990

[51] Int. Cl.$^5$ ................................................ G01L 5/24
[52] U.S. Cl. ............................. 73/862.21; 73/862.08; 29/721
[58] Field of Search ............... 73/847, 862.08, 862.21, 73/862.23, 761, 862.19; 29/240, 721

[56] References Cited

U.S. PATENT DOCUMENTS

| | | | |
|---|---|---|---|
| 2,300,288 | 10/1942 | Hullhorst | 73/862.19 |
| 3,044,322 | 7/1962 | George . | |
| 3,220,287 | 11/1965 | Alvey . | |
| 3,232,101 | 2/1966 | Siegler | 73/862.19 |
| 3,448,988 | 6/1969 | Athansiou . | |
| 4,304,510 | 12/1981 | Machida . | |

OTHER PUBLICATIONS

Bill Tools Catalogue, p. 88.

Primary Examiner—Charles A. Ruehl
Attorney, Agent, or Firm—James G. Porcelli; Thomas R. Trempus

[57] ABSTRACT

A tightening fixture for tightening a lock nut on a chuck including a torque readout device for measuring the torque applied to tighten the lock nut. The tightening fixture includes a stationary support block having a torque transmitting collar rotatively mounted therein. The torque transmitting collar is designed to receive and hold the chuck so that the chuck is held nonrotatable with respect to the collar. When torque is applied to tighten the lock nut on the chuck, the chuck and collar rotate as a unit. A torque indicator is mounted in the stationary block and is responsive to the rotation of the torque transmitting collar to provide an indication of the torque applied to tighten the lock nut.

15 Claims, 5 Drawing Sheets

5,109,706

TIGHTENING FIXTURE WITH BUILT-IN TORQUE READOUT DEVICE

BACKGROUND OF THE INVENTION

The present invention relates to a tightening fixture for a chuck. More particularly, the present invention relates to a built-in torque readout device for measuring the torque applied to tighten the lock nut of chuck.

In high speed tooling, it is important to tighten the lock nut of a chuck to a specified torque. If the lock nut is not tightened sufficiently, the tool may come loose during operation posing a hazardous threat to anyone standing nearby. On the other hand, over-tightening may cause damage to the tool or chuck.

Tightening fixtures are currently in use to assist tightening of a lock nut on a chuck. Generally speaking, a tightening fixture comprises a stationary block having an opening formed therein to receive a toolholder or chuck. Typically, the toolholder will include a flange having one or more keyways. Keys fixed to the stationary block engage the keyways on the toolholder to prevent rotation of the toolholder relative to the tightening fixture. Thus, the tightening fixture functions in a manner similar to a vice or clamp to hold the toolholder in a fixed position as the lock nut is tightened.

Currently, there are no tightening fixtures which have the capability of measuring the tightening torque applied to tighten the lock nut on a chuck. Torque is determined by using a conventional torque wrench to tighten the lock nut. However, a torque wrench may not always be available when it is needed. Further, torque wrenches cannot be used in all applications.

SUMMARY AND OBJECTS OF THE INVENTION

The present invention eliminates the need for torque wrenches to measure tightening torque by incorporating a torque measuring device into the tightening fixture. The torque measuring device of the present invention includes a dial indicator mounted in a stationary block at a predetermined radius from the center of the block. A torque transmitting collar is rotatably mounted in a stationary block and is adapted to receive and hold the chuck. When torque is applied to tighten the lock nut on the chuck, the collar rotates against an actuator rod which in turn pushes against the dial indicator resulting in a corresponding movement of the dial indicator's pointer.

Based on the foregoing, it is a primary object of the present invention to provide a tightening fixture for tightening a lock nut on a chuck having a built in torque measuring device.

Another object of the present invention is to provide a tightening fixture for tightening a lock nut on a chuck which is adapted to receive various sizes of chucks.

Another object of the present invention is to provide a tightening fixture for tightening a lock nut on a chuck having a relatively simple construction with few moving parts.

Another object of the present invention is to provide a tightening fixture for tightening a lock nut on a chuck which is easy to use.

Other objects and advantages of the present invention will become apparent and obvious from a study of the following description and the accompanying drawings which are merely illustrative of such invention.

DETAILED DESCRIPTION OF THE DRAWINGS

Figure 1:
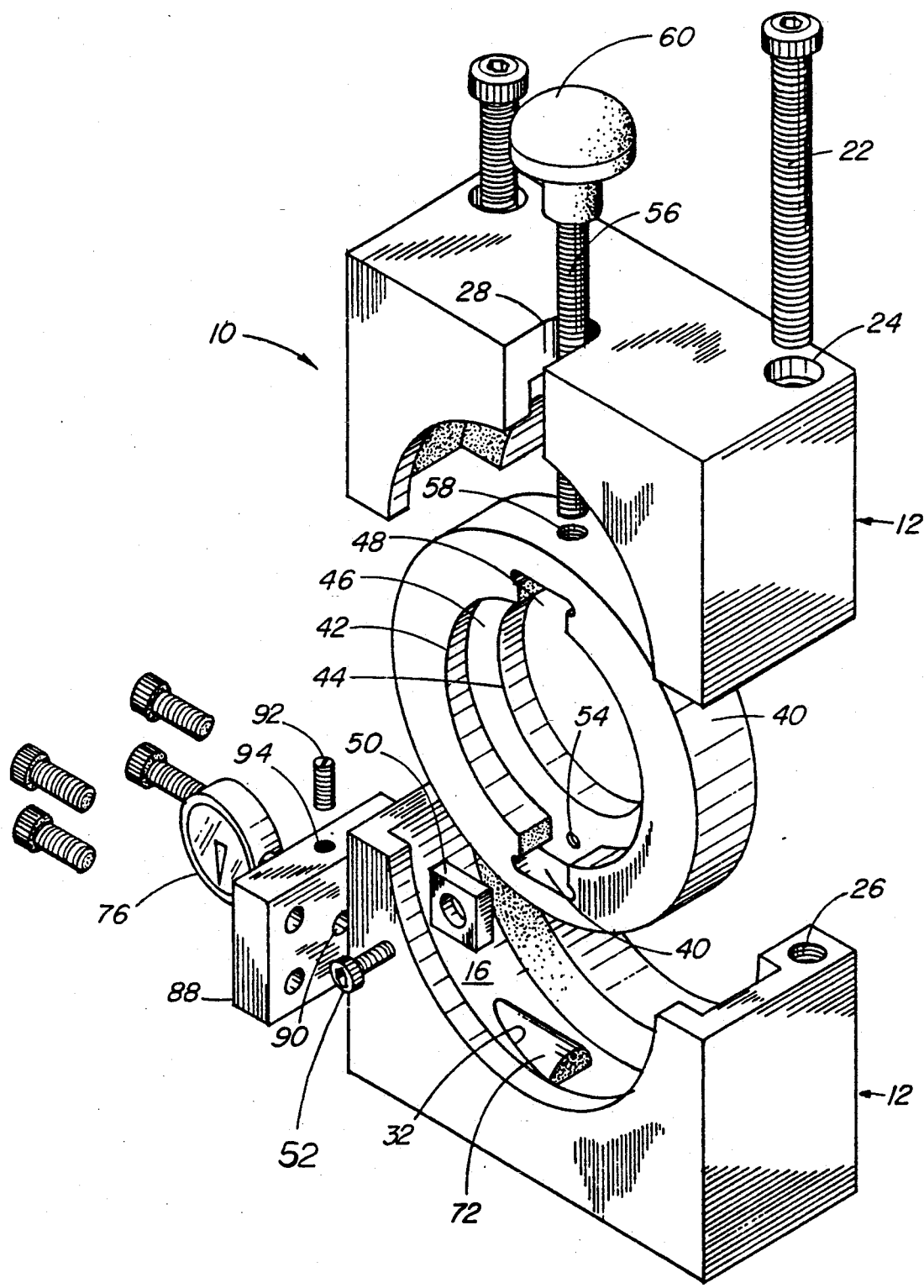
FIG. 1 is an exploded perspective view of the tightening fixture.
Figure 2:
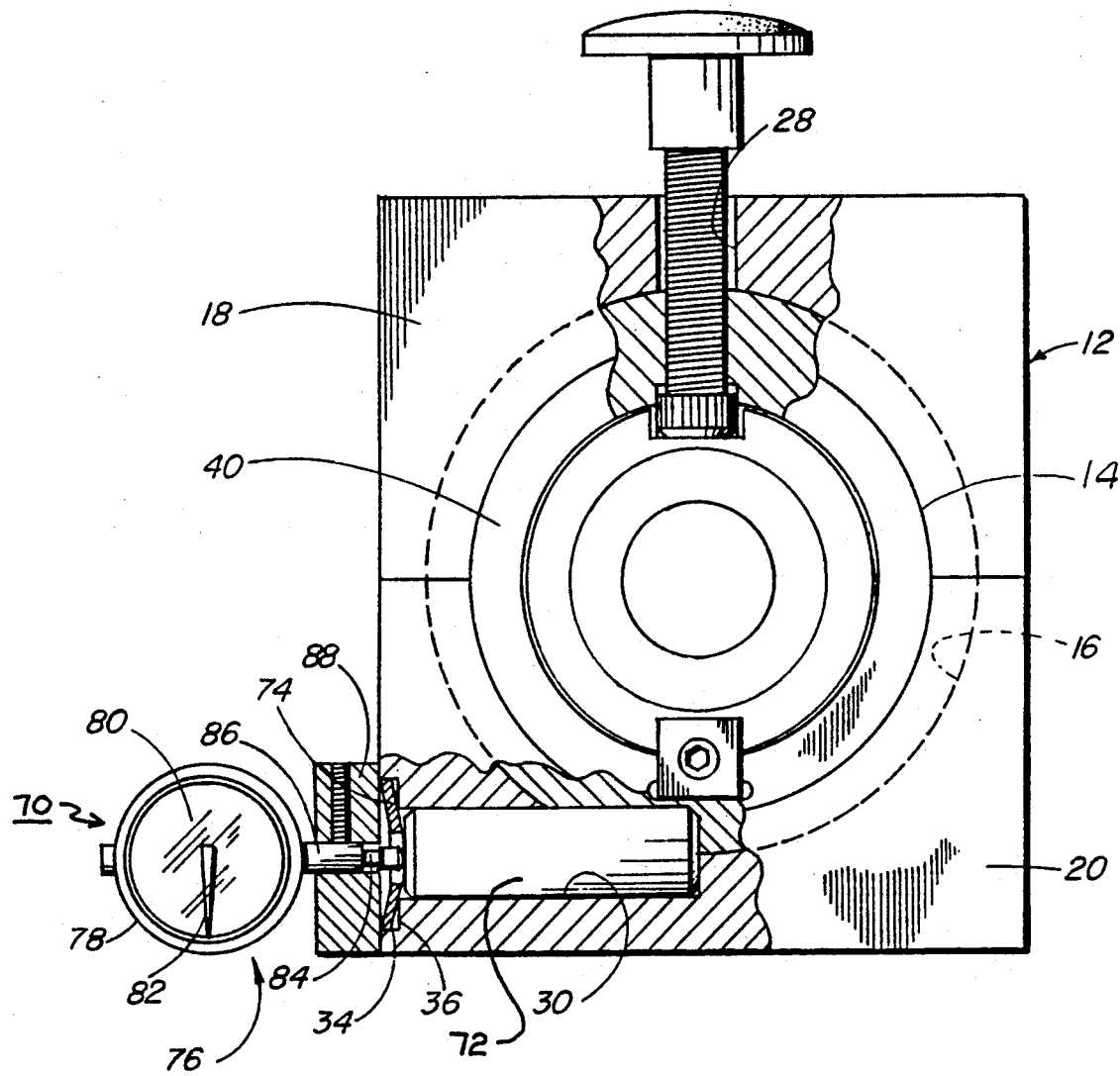
FIG. 2 is a front elevation view of the tightening fixture with portions thereof shown in sections to illustrate the invention.
Figure 3:
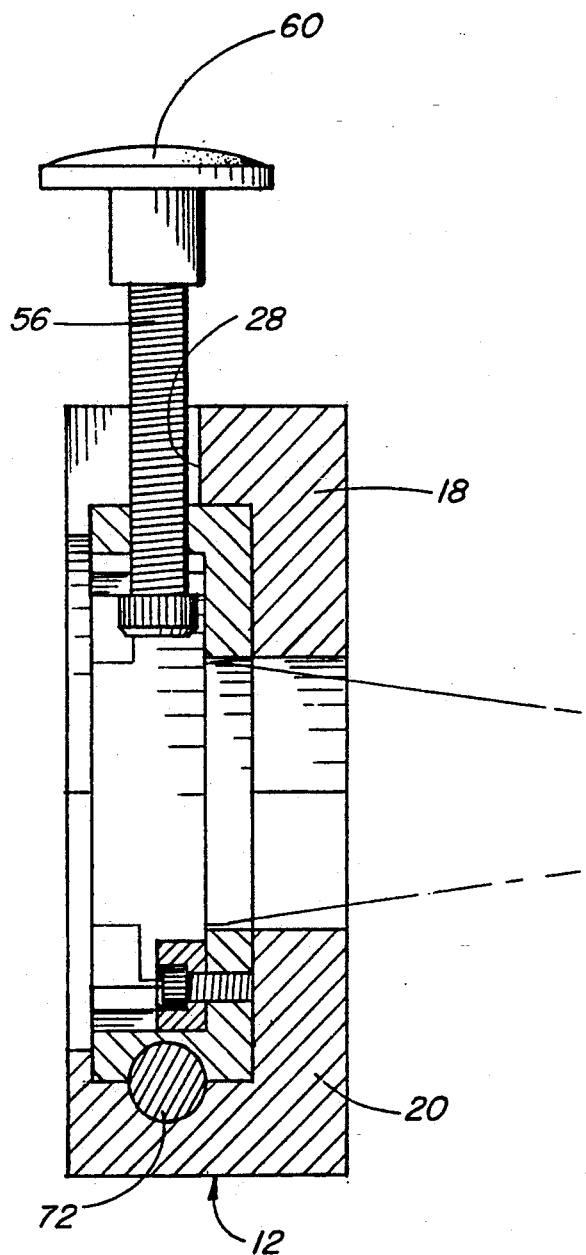
FIG. 3 is a section view of the tightening fixture taken through a plane parallel to the sides of the support block.

Referring now to the drawings, the tightening fixture of the present invention is shown therein and indicated generally by the numeral 10. The tightening fixture 10 is used for tightening the lock nut of a conventional chuck. Generally speaking, the chuck includes a tapered rear end and a forward ends separated by a flange. A tapered bore is formed in the front end for receiving a collet. A lock nut is threaded on the front end of the chuck. When the lock nut is tightened, the collet is forced into the tapered bore to compress the collet into gripping engagement with a tool. The tightening fixture 10 of the present invention includes a built-in torque measuring device for indicating the amount of torque applied to tighten the lock nut.

The tightening fixture 10 includes a generally stationary support block 12; a torque transmitting collar 40 rotatably mounted in the support block 12 for receiving and holding the chuck; a locking means 50 for holding the chuck nonrotatable with respect to the torque transmitting collar 40; and a torque indicator assembly 76 mounted in the stationary block and responsive to the rotation of the torque transmitting collar 40 for indicating the torque applied to the lock nut.

The support block 12 is a square shaped block made of low carbon steel. The support block 12 is formed with a central opening 14 extending therethrough from the front face to the back face. The wall of the central opening 14 is formed with a continuous, annular channel 16 for receiving the torque transmitting collar 40.

The support block 12 is constructed in two parts—a top half 18 and a bottom half 20. The top half 18 rests on top of the bottom half 20 and the two halves are secured by a pair of securing bolts 22. The securing bolts 22 pass through recessed through-holes 24 in the top half 18 and screw into threaded holes 26 in the bottom half 20. The top half 18 is also formed with a lock screw notch 28 extending from the front face of the block 12 to accommodate a chuck lock screw 56 which is described below.

The bottom half 20 of the support block 12 includes an actuator rod hole 30 which extends from one side face of the support block 12 and intersects the annular channel 16 at its lowermost point forming an elliptical opening 32 in the bottom of the channel 16. The opposite end of the actuator rod hole 30 opens to a recess 34. A shoulder 36 joins the cylindrical wall of the recess 34 with the actuator rod hole 30. Preferably, the actuator rod hole 30 extends tangentially with respect to the annular channel 16. In other words, the axis of the actuator rod hole 30 is tangent to the annular channel 16.

Figure 4A:
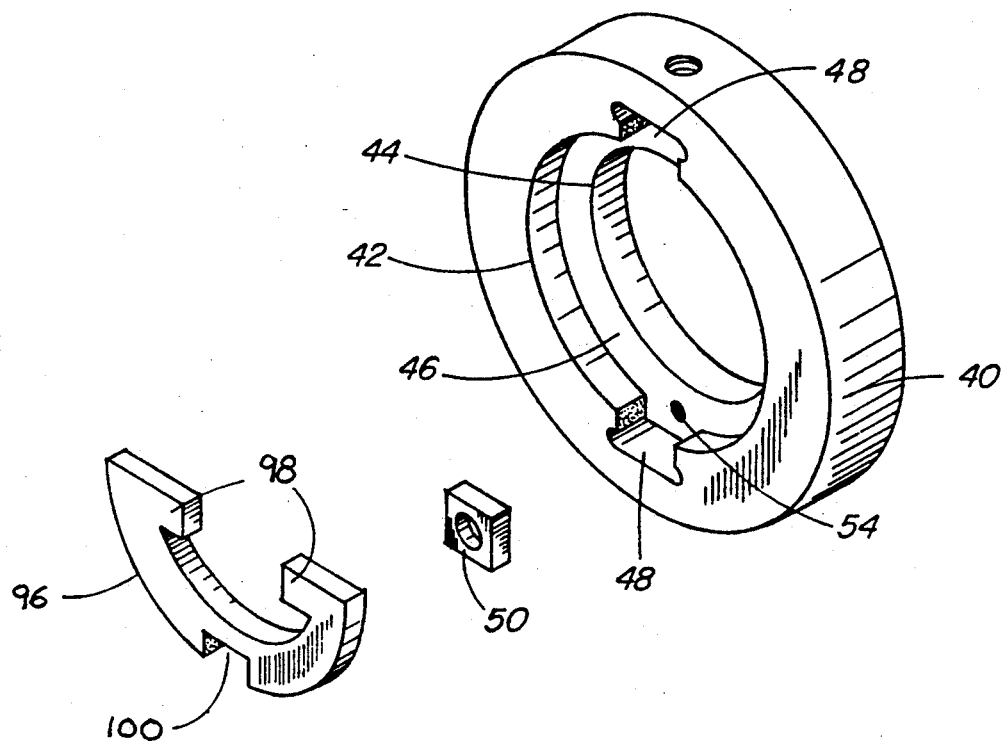
FIG. 4A is a perspective view of the torque transmitting collar and adapter plate used in the present invention.
Figure 4B:
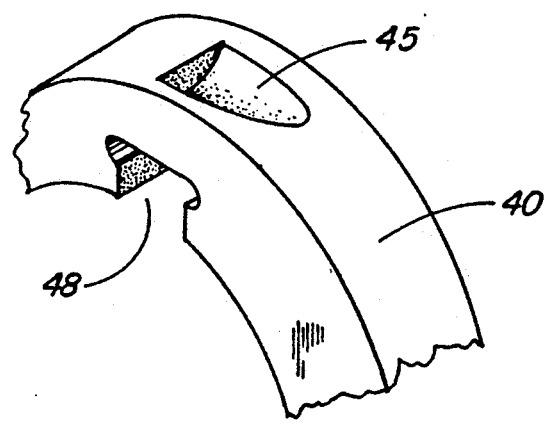
FIG. 4B is a partial perspective view illustrating the bottom side of the torque transmitting collar.

Referring now to the torque transmitting collar 40, which is seen best in FIGS. 4A and 4B, it is seen that the collar 40 is circular shaped. The outer diameter of the collar 40 is slightly smaller than the diameter of the annular channel 16 of the support block 12 so as to allow the collar 40 to rotate freely in the channel 16. A stepped opening including a forward portion 42 and a rearward portion 44 is formed in the collar 40. A forwardly facing step or shoulder 46 is formed between the forward and rearward portions 42 and 44 of the stepped opening.

The rearward portion 44 of the opening is sized to allow the tapered end of the chuck to pass freely therethrough but is smaller than the flange of the chuck. The forward portion 42 of the stepped opening is sized large enough to accommodate the flange of the chuck. Two keyways 48 are formed in the forward portion 42 of the collar 40 at diametrically opposed locations. A key 50 is fixed in the lowermost keyway 48 and is secured by a key bolt 52 which screws into a threaded key bolt hole 54 in shoulder 46. The key 50 is adapted to engage with a keyway formed in the flange of the chuck so as to hold the chuck nonrotatable with respect to the collar 40.

A radially extending lock screw hole 58 is formed in the collar 40 at a point diametrically opposed to the key 50. A chuck lock screw 56 is threaded into the lock screw hole 58 in the collar 40 and passes through the uppermost keyway 48. The chuck lock screw 56 is adapted to engage one of the keyways in the flange of the chuck to secure the chuck in the collar 40. The chuck lock screw 56 is a conventional hand toggle screw having a hand grip 60 thereon for gripping and turning the screw. The screw extends upwardly from the collar and passes through the lock screw notch 28 in the top half 18 of the support block 12. The lock screw notch 28, therefore, should be of sufficient size to allow for the movement of the chuck lock screw 56 as the collar 40 is rotated in the support block 12.

Referring now to the torque indicator assembly, which is indicated generally by the number 70, the same includes an actuator rod 72, a resistance element 74, and a torque indicator 76.

The actuator rod 72 is disposed in the actuator rod hole 30 in the support block 12 and moves axially therein. One end of the actuator rod 72 is engaged with the notch 45 on the torque transmitting collar 40. The opposite end of the actuator rod pushes simultaneously against the resistance element 74 and torque indicator 76. The resistance element may be a disc spring to resist axial displacement of the actuator rod 72. The spring constant of the spring will, of course, affect the calibration of the torque indicator 76 since a higher spring constant means greater force is required to move the actuator rod 72. Thus, care should be exercised in selection of a disc spring with any appropriate spring rate.

Referring now to the torque indicator 76, it is a conventional torque indicator including a torque head 78 with a scale on its face 80. A pointer 82 moves circularly on the face 80 to indicate torque. The pointer 82 is operatively connected to a push rod 84 extending through the stem 86 of the indicator 76. When the push rod 84 is depressed, the pointer 82 moves correspondingly. Torque indicators of this type are well known to those skilled in the art and a more detailed description is therefore omitted for the sake of brevity.

The torque indicator 76 is mounted to the side of the support block 12 by means of an indicator mounting block 88. The indicator mounting block 88 includes a stem opening 90 for receiving the stem 86 of the indicator 76. A set screw 92 threaded into a set screw hole 94 in the indicator mounting block 88 secures the torque indicator 76. In addition to mounting the torque indicator 76, the indicator mounting block 88 retains the resistance element in the recess 34 of the stationary block 12.

From the forgoing, it is apparent that the axial displacement of the actuator rod 72 by the torque transmitting collar 40 causes a corresponding movement of the pointer 82. The torque indicator 76 is calibrated by placing the actuator rod 72 at the proper radius from the center of the tightening fixture and selecting a disc spring with the proper spring rate as the resistance element 74. In the embodiment shown, the actuator rod 72 is placed at a three inch radius from the center of the fixture 10 and the spring rate of the resistance element 74 is 40,000 lbs/inch. Thus, a 0.001 inch movement of the actuator rod 72 equals ten foot pounds of torque.

Since chucks come in many different sizes, the present invention includes an adapter. Referring to FIG. 4A, there is shown an adapter plate 96 which is used in connection with the present invention to adapt the collar 40 to receive chucks of various sizes. The adapter plate 96 is an arcuate-shaped plate having two inwardly extending prongs 98 adapted to engage the keyways in a conventional chuck. A keyway 100 is formed at the bottom of the adapter plate 96 and mates with the key 50 which is fixed to the collar 40.

The adapter plate 96 inserts into the forward portion 42 of the collar 40 until it makes face-to-face contact with the flange seat 46. The key 50 fixed to the collar 40 prevents rotation of the adapter plate 96 with respect to collar 40. Similarly, the inwardly projecting prongs 98 engage the keyways in the chuck to prevent the chuck from rotating.

Figure 5:
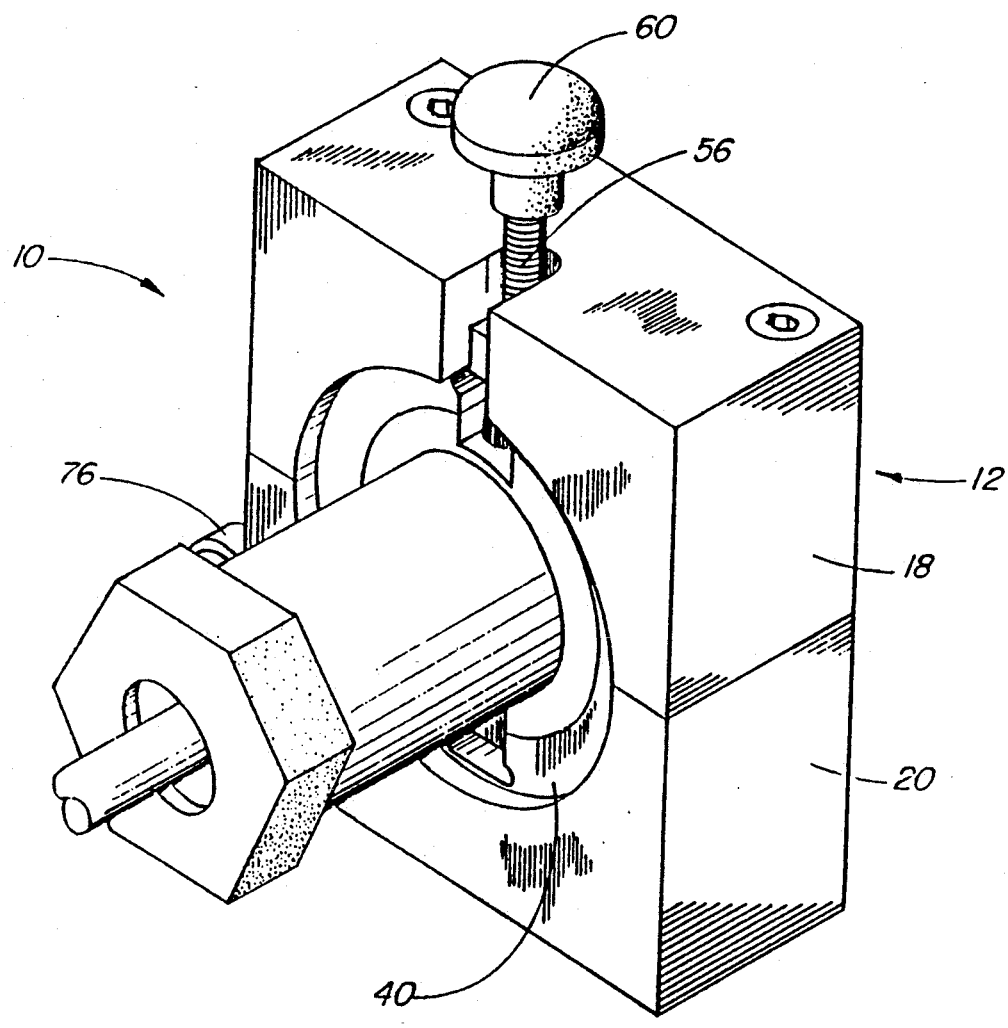
FIG. 5 is a perspective view of an assembled tightening fixture showing a chuck mounted therein.

To use the tightening fixture of the present invention, a chuck is inserted into the torque transmitting collar 40 so that one keyway on the chuck engages with the key 50 of the torque transmitting collar 40 as shown in FIG. 5. The chuck lock screw 56 is then tightened until it engages the opposite keyway in the chuck. Once the chuck is secured within the tightening fixture 10, a conventional hex type wrench or spanner wrench can be used to tighten the lock nut on the chuck. Because the chuck is held nonrotatable with respect to the collar 40, the torque applied to tighten the lock nut causes the torque transmitting collar 40 to rotate. The actuator rod 72 is engaged by the notch in the underside of the torque transmitting collar 40 as the torque transmitting collar rotates against the actuator rod 40. The actuator rod 40 is axially displaced and presses simultaneously against the resistance means 74 and push rod 84 of the dial indicator 76 causing a corresponding movement of the pointer 82. When the torque is removed, the resistance means 74 urges actuator rod 72 back to nonindicating position.

What is claimed is:

1. A tightening fixture for holding a chuck and indicating the torque applied to tighten a lock nut on the chuck, comprising:
   (a) a stationary block;
   (b) a torque transmitting collar rotatably mounted in the stationary block for receiving and holding the chuck;

(c) locking means for holding the chuck nonrotatable with respect to the collar so that when torque is applied to tighten the locking nut, the chuck and collar rotate as a unit;

(d) a torque indicator assembly responsive to the rotation of the collar for indicating the tightening torque being applied to the lock nut of the chuck; and (e) said stationary block indicating an annular recess and the torque transmitting collar is rotatably mounted in the annular recess.

2. The tightening fixture of claim 1 wherein the torque indicator assembly includes a movable actuator mounted in the stationary block and engaged with the rotating collar so that when the collar is rotated the actuator is displaced axially; and a torque indicator responsive to the axial displacement of the actuator for indicating the torque applied to tighten the lock nut on the chuck.

3. The tightening fixture of claim 2 wherein the collar includes a notch for receiving the actuator.

4. The tightening fixture of claim 3 wherein the torque indicator is a dial indicator having a push rod extending therefrom that is engaged by the actuator so that when the actuator is moved axially by the collar, the actuator pushes the push rod of the dial indicator causing the dial to indicate the tightening torque being applied to the lock nut of the chuck.

5. The tightening fixture of claim 4 including resistance means for resisting the axial movement of the actuator as the torque transmitting collar is turned due to a tightening torque being applied to the lock nut of the chuck.

6. The tightening fixture of claim 1 further including at least one chuck adapter and means for mounting the chuck adapter to the torque transmitting collar for adapting the tightening fixture to receive chucks of different sizes.

7. The tightening fixture of claim 6 wherein the chuck adapter includes a semi-circular adapter plate having at least one key for insertion into a keyway of the chuck to be held by the adapter.

8. The tightening fixture of claim 1 wherein the locking means for holding the chuck nonrotatable with respect to the collar comprises a key fixed to the collar for engaging with a keyway on the chuck.

9. A tightening fixture for holding a chuck and indicating the torque being applied to tighten a lock nut on the chuck, comprising:

(a) a stationary block having an annular channel formed therein;

(b) a torque transmitting collar rotatably mounted within the annular channel of the block for receiving and holding the chuck;

(c) means associated with the torque transmitting collar for holding the chuck in a stationary position with respect to the collar such that when torque is applied to tighten the lock nut, the chuck and collar rotate as a unit;

(d) a bore extending through the stationary block and open to the torque transmitting collar;

(e) an actuator movably mounted for axial movement in the bore and engaged with the collar so that the collar, upon being rotated, axially displaces the actuator;

(f) resistance means engaged with the actuator for inhibiting the movement of the actuator; and (g) a torque indicator engaged by the actuator and responsive to the axial displacement of the actuator for indicating the torque applied to tighten the lock nut on the chuck.

10. The tightening fixture of claim 10 wherein the collar includes an actuator notch formed in the outer surface of the collar for engaging with an end portion of the actuator.

11. The chuck tightening fixture of claim 9 including at least one chuck adapter and means for mounting the adapter to the rotating collar for adapting the chuck tightening fixture to receive and hold chucks of different sizes.

12. The chuck tightening fixture of claim 9 wherein the means for holding the chuck nonrotatable with respect to the collar includes a key fixed to the collar and adapted to be inserted into a keyway formed in the chuck.

13. The chuck tightening fixture of claim 12 further including securing means for securing the chuck in the tightening fixture.

14. The tightening fixture of claim 13 wherein the securing means includes a chuck lock screw threaded into the collar and engageable with the chuck held by the collar.

15. A method of holding a chuck, tightening a lock nut associated with a lock nut, and indicating the torque being applied to the lock nut, comprising the steps of:

(a) inserting a chuck having a lock nut into a torque transmitting collar rotatively mounted within a stationary block;

(b) securing the chuck within the rotating collar such that the chuck may not rotate with respect to the collar but wherein the chuck and collar rotate as a unit;

(c) tightening the lock nut of the chuck and causing the torque transmitting collar to rotate;

(d) engaging an actuator with the torque transmitting collar as the lock nut is tightening and causing the actuator to move in response to the collar rotating; and (e) transmitting the force applied to the actuator by the rotating collar to a torque indicating device and indicating the tightening torque being applied to the locking nut.

* * * * *